United States Patent
Smith et al.

(10) Patent No.: US 9,671,315 B2
(45) Date of Patent: Jun. 6, 2017

(54) SYSTEM AND METHOD FOR NUT SWAGING VERIFICATION

(71) Applicant: Lockheed Martin Corporation, Bethesda, MD (US)

(72) Inventors: Jamie M. Smith, Keller, TX (US); Eric Grabow, Lake Oswego, OR (US); Douglas Howard McKay, Grand Prairie, TX (US); Matthew Timothy McKee, Willow Park, TX (US); Russell Miller, Danbury, TX (US); René Jean Robért, Metairie, LA (US)

(73) Assignee: Lockheed Martin Corporation, Bethesda, MD (US)

( * ) Notice: Subject to any disclaimer, the term of this patent is extended or adjusted under 35 U.S.C. 154(b) by 69 days.

(21) Appl. No.: 14/813,786

(22) Filed: Jul. 30, 2015

(65) Prior Publication Data

US 2017/0030698 A1    Feb. 2, 2017

(51) Int. Cl.
   *G01B 3/34*    (2006.01)
   *G01M 99/00*    (2011.01)
   (Continued)

(52) U.S. Cl.
   CPC ........... *G01M 99/00* (2013.01); *B25B 13/065* (2013.01); *B25B 23/1415* (2013.01); *F16B 39/026* (2013.01)

(58) Field of Classification Search
   CPC ...................................................... G01B 3/34
   (Continued)

(56) References Cited

U.S. PATENT DOCUMENTS

| 3,695,086 A | 10/1972 | Savage |
| 4,138,820 A * | 2/1979 | O'Connor ................ G01B 3/34 |
| | | 33/199 R |

(Continued)

FOREIGN PATENT DOCUMENTS

| EP | 0 001 935 A1 | 5/1979 |
| GB | 2 146 724 A | 4/1985 |
| GB | 2 277 471 A | 11/1994 |

OTHER PUBLICATIONS

EPO Netherlands Communication regarding European search report; Invitation pursuant to Rule 62a(1) EPC; re: Application No. 16181814.Jan. 1701; Ref. EP106888GM, (Dec. 22, 2016) Dec. 22, 2016.

(Continued)

*Primary Examiner* — G. Bradley Bennett
(74) *Attorney, Agent, or Firm* — Baker Botts L.L.P.

(57) ABSTRACT

An apparatus comprises an outer shell, a gauge ring, and a spring. The gauge ring is configured to rotate to a first position as a nut passes through an opening of the outer shell and contacts a bottom surface of the gauge ring, the first position permitting the nut to pass through the gauge ring and into a socket by aligning one or more gauge ring lobe slits with one or more outer shell lobe slits and one or more deformable lobes of the nut. The spring is configured to rotate the gauge ring to the second position after the nut passes through the gauge ring and into the socket, the second position preventing the nut from exiting the socket by preventing alignment of the one or more gauge ring lobe slits with the one or more outer shell lobe slits.

20 Claims, 6 Drawing Sheets

(51) Int. Cl.
  *B25B 13/06* (2006.01)
  *B25B 23/14* (2006.01)
  *F16B 39/02* (2006.01)

(58) Field of Classification Search
  USPC .......................... 33/501, 541, 545, 551, 562
  See application file for complete search history.

(56) References Cited

U.S. PATENT DOCUMENTS

| | | | | |
|---|---|---|---|---|
| 5,428,899 | A * | 7/1995 | Radossi | B25H 7/005 33/21.1 |
| 5,590,992 | A * | 1/1997 | Russell | B60B 7/14 301/37.374 |
| 6,398,471 | B1 | 6/2002 | Fischer | |
| 6,533,514 | B2 | 3/2003 | Fischer | |
| 7,152,307 | B2 | 12/2006 | Swanberg et al. | |
| 7,597,517 | B2 * | 10/2009 | Beeles | F16B 19/05 29/243.529 |
| 9,416,810 | B2 * | 8/2016 | Swinderman | F16B 41/002 |
| 2009/0056160 | A1 * | 3/2009 | Hu | G01B 3/166 33/806 |
| 2010/0186250 | A1 * | 7/2010 | Hu | G01B 3/166 33/807 |
| 2012/0131808 | A1 * | 5/2012 | Spencer | F01L 1/20 33/611 |
| 2015/0204642 | A1 * | 7/2015 | DeYaeger | G01B 3/36 33/199 R |

OTHER PUBLICATIONS

EPO Germany Communication regarding European search report; pursuant to Rule 62 EPC; re: Application No. 16181814.1-1701; Ref. EP106888GM; report received Mar. 24, 2017, (Mar. 23, 2017) Mar. 23, 2017.

* cited by examiner

FIG. 1A
Un-Swaged

FIG. 1B
Swaged

SYSTEM AND METHOD FOR NUT SWAGING VERIFICATION

TECHNICAL FIELD

The present disclosure relates in general to fastening systems and, more particularly, to a system and method for nut swaging verification.

BACKGROUND

In the process of manufacturing aircraft or other vehicles and products, a large number of fasteners may be required to ensure proper operation of the finished product. In certain circumstances, various components may be required to meet certain specifications. For example, proper swaging of installed nuts may need to be verified. Verifying compliance with specifications can be time consuming and open to human error.

SUMMARY

According to embodiments of the present disclosure, disadvantages and problems associated with previous techniques for verifying nut swaging may be reduced or eliminated.

In certain embodiments, a system for verifying nut swaging is disclosed. The system for verifying nut swaging comprises a fastening system and a nut swaging verification apparatus. The nut swaging verification apparatus comprises an outer shell comprising an opening comprising one or more outer shell lobe slits, the opening configured to allow a nut comprising one or more deformable lobes to pass through the opening and into an interior portion of the outer shell, a gauge ring configured to be placed inside the interior portion of the outer shell, and a spring configured to be coupled to the gauge ring and configured to cause the gauge ring to rotate from a first position to a second position. The gauge ring comprises a bottom surface configured to face the first opening, a top surface opposite the bottom surface, and a keyhole comprising one or more gauge ring lobe slits and a sloped entry. The gauge ring is configured to rotate to the first position as the nut passes through the opening of the outer shell and contacts the sloped entry of the gauge ring, the first position permitting the nut to pass through the gauge ring and into a socket by aligning the one or more gauge ring lobe slits with the one or more outer shell lobe slits and the one or more deformable lobes of the nut. The spring is configured to rotate the gauge ring to the second position after the nut passes through the gauge ring and into the socket, the second position preventing the nut from exiting the socket by preventing alignment of the one or more gauge ring lobe slits with the one or more outer shell lobe slits. The gauge ring, while in either the first or second position, is configured to permit the nut to exit the socket after the one or more deformable lobes of the nut have been deformed by the socket.

In certain embodiments, the sloped entry may comprise an angle of approximately thirty-seven degrees. The gauge ring may be further configured to rotate to the first position as the nut moves along the sloped entry. The outer shell may further comprise a manual override opening and the gauge ring further comprises a manual override tab positioned in the manual override opening of the outer shell. When pressure is applied to the manual override tab, the nut may be able to be removed before the one or more deformable lobes of the nut have been deformed. The socket may be configured to deform the one or more deformable lobes of the nut during fastening. At least a portion of the torsional spring may be located between an outer wall of the outer shell and a boundary wall located in the interior of the outer shell.

Also disclosed is an apparatus. The apparatus comprises an outer shell, a gauge ring, and a spring. The outer shell comprises an opening comprising one or more outer shell lobe slits, the opening configured to allow a nut comprising one or more deformable lobes to pass through the opening and into an interior portion of the outer shell. The gauge ring is configured to be placed inside the interior portion of the outer shell, the gauge ring comprising a bottom surface configured to face the opening of the outer shell, a top surface opposite the bottom surface, and a keyhole comprising one or more gauge ring lobe slits and a sloped entry. The spring is configured to be coupled to the gauge ring and configured to cause the gauge ring to rotate from a first position to a second position. The gauge ring is configured to rotate to the first position as the nut passes through the opening of the outer shell and contacts the sloped entry of the gauge ring, the first position permitting the nut to pass through the gauge ring and into a socket by aligning the one or more gauge ring lobe slits with the one or more outer shell lobe slits and the one or more deformable lobes of the nut. The spring is configured to rotate the gauge ring to the second position after the nut passes through the gauge ring and into the socket, the second position preventing the nut from exiting the socket by preventing alignment of the one or more gauge ring lobe slits with the one or more outer shell lobe slits.

In certain embodiments, the gauge ring, while in either the first or second position, may be configured to permit the nut to exit the socket after the one or more deformable lobes of the nut have been deformed by the socket. The sloped entry may comprise an angle of approximately thirty-seven degrees. The gauge ring may be further configured to rotate to the first position as the nut moves along the sloped entry. The outer shell may further comprise a manual override opening and the gauge ring may further comprise a manual override tab positioned in the manual override opening of the outer shell, such that when pressure is applied to the manual override tab, the nut can be removed before the one or more deformable lobes of the nut have been deformed. The socket may be configured to deform the one or more deformable lobes of the nut during fastening. In certain embodiments, at least a portion of the torsional spring may be located between an outer wall of the outer shell and a boundary wall located in the interior of the outer shell.

Also disclosed is a method for verifying nut swaging. The method comprises positioning a nut swaging verification apparatus on a nut comprising one or more deformable lobes, and fastening the nut to a bolt using a fastening system, the fastening system coupled to the nut swaging verification apparatus by a socket, wherein the socket is configured to deform the one or more deformable lobes of the nut during fastening. The method further comprises determining whether the nut was properly swaged based at least in part on whether the nut swaging verification apparatus can be removed from the nut.

In certain embodiments, the method may further comprise one of determining that the one or more deformable lobes of the nut were deformed when the nut swaging verification apparatus can be removed from the nut, and determining that the one or more deformable lobes of the nut were not deformed when the nut swaging verification apparatus cannot be removed from the nut. The nut swaging verification apparatus may comprise an outer shell, a gauge ring, and a spring. The outer shell may comprise an opening comprising one or more outer shell lobe slits, the opening configured to allow a nut having one or more deformable lobes to pass through the opening and into an interior portion of the outer shell. The gauge ring may be configured to be placed inside the interior portion of the outer shell. The gauge ring may comprise a bottom surface configured to face the opening of the outer shell, a top surface opposite the bottom surface, and a keyhole comprising one or more gauge ring lobe slits and a sloped entry. The spring may be configured to be coupled to the gauge ring and configured to cause the gauge ring to rotate from a first position to a second position. The gauge ring may be configured to rotate to the first position as the nut passes through the opening of the outer shell and contacts the sloped entry of the gauge ring, the first position permitting the nut to pass through the gauge ring and into the socket by aligning the one or more gauge ring lobe slits with the one or more outer shell lobe slits and the one or more deformable lobes of the nut. The spring may be configured to rotate the gauge ring to the second position after the nut passes through the gauge ring and into the socket, the second position preventing the nut from exiting the socket by preventing alignment of the one or more gauge ring lobe slits with the one or more outer shell lobe slits.

In certain embodiments, the gauge ring may be further configured to rotate to the first position as the nut moves along the sloped entry. The gauge ring, while in either the first or second position, may be configured to permit the nut to exit the socket after the one or more deformable lobes of the nut have been deformed by the socket. The outer shell may further comprise a manual override opening and the gauge ring may further comprise a manual override tab positioned in the manual override opening of the outer shell, and the method may further comprise applying pressure to the manual override tab to remove the nut swaging verification apparatus upon a determination that the one or more deformable lobes of the nut have not been properly deformed.

Certain embodiments of the present disclosure may provide one or more technical advantages. As one example, certain embodiments may reduce or eliminate the need for a mechanic to perform a swaging inspection after nuts are installed, decreasing the potential that the mechanic will inadvertently overlook some points of inspection. As another example, certain embodiments may reduce the number of points that a quality inspector would need to recheck. As yet another example, the risk associated with repairing nonconforming fastener installations may be minimized by identifying and reprocessing them as early as possible in the production process. As a further example, no major modifications may need to be made to the fastening system to enable nut swaging verification to occur at the point of installation. Other advantages may be readily apparent to those having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

In the process of manufacturing aircraft or other vehicles and products, a large number of fasteners may be required to ensure proper operation of the finished product. For example, aircraft manufacturing typically involves the installation of thousands of fasteners critical to the structural integrity and performance of the airframe, and has strict quality control requirements. Various types of fasteners may be used to construct an aircraft or other vehicles and products. For example, in some instances the Alcoa EDDIE-BOLT fastening system may be used. Each fastener installation may have numerous quality control features that require visual and manual inspection to ensure compliance with engineering specifications. One inspection may be completed by the mechanic, and one may be completed by a quality inspector. Existing inspection methods may be very labor intensive. Given the volume of fasteners involved, many hours may be spent conducting post-process inspection of fully compliant fastener installations on each aircraft.

Some types of fasteners, such as the EDDIE-BOLT fastening system, are designed so that when properly installed, one or more lobes on a nut are rounded off, ensuring the proper torque has been achieved. This process may be referred to as swaging the nut. Proper swaging of the nut is one feature that may be inspected after each installation to ensure that the proper torque has been achieved. An existing solution for verifying nut swaging is to use a thimble or paddle gauge. During inspection of an aircraft, for example, the thimble or paddle gauge must be placed over every nut to verify that proper swaging has been achieved. In some cases, this may be done manually to 100% of installed nuts by both the mechanic and the quality inspector. Such an approach may have certain deficiencies. For example, the process of manually verifying nut swaging using a small paddle or thimble gauge is extremely time consuming and open to human error.

The following describes embodiments of a nut swaging verification apparatus to address these and other problems associated with fastener installations. In general, the nut swaging verification apparatus enables an installer of a fastener using a fastening system to install the fastener and verify proper swaging of the nut at the time of installation. To do so, the nut swaging verification apparatus comprises an outer shell, a gauge ring, a torsional spring, and a socket. The gauge ring and outer shell may be positioned in front of the socket. As the nut swaging verification apparatus is placed over an unswaged nut, the nut passes through a first opening in the outer shell and a keyhole in the gauge ring before reaching the socket. The gauge ring ensures that an unswaged nut is only allowed to pass through the ring during insertion and cannot be removed unless proper swaging has occurred, or a manual override feature of some embodiments is used.

In certain embodiments, the gauge ring may include a sloped entry that, in response to pressure being applied by the unswaged nut, causes the gauge ring to rotate and allows the unswaged nut to pass through the keyhole in the gauge ring. As the nut contacts and moves along the sloped entry, pressure on the nut causes the gauge ring to rotate to a first position, aligning one or more gauge ring lobe slits of the keyhole with outer shell lobe slits. When the one or more gauge ring lobe slits are aligned with the outer shell lobe slits, the one or more deformable lobes of the nut can pass through the keyhole of the gauge ring and into the socket. Once the lobes have passed through the keyhole, a spring attached to the gauge ring rotates the ring to a second position, locking the nut inside the socket. At this point, the fastening system may install the nut. Once proper swaging has been achieved, the nut swaging verification apparatus can be removed from the nut. If proper swaging is not achieved, however, an installer will not be able to remove the nut swaging verification apparatus, alerting the installer to the improper installation.

The nut swaging verification apparatus described herein may advantageously eliminate the need for a mechanic to manually perform the swaging inspection after nuts are installed, potentially decreasing or eliminating the risk of a mechanic inadvertently overlooking some points of inspection. Furthermore, the nut swaging verification apparatus may advantageously reduce the number of points that the quality inspector would need to recheck. In addition, the risk associated with repairing nonconforming fastener installations may be minimized by identifying and reprocessing nonconforming fastener installations as early as possible in the production process. In some embodiments, no major modifications may need to be made to an existing fastening tool, such as an EDDIE-BOLT wrench, to enable this inspection to occur at the point of installation.

Figure 1A:
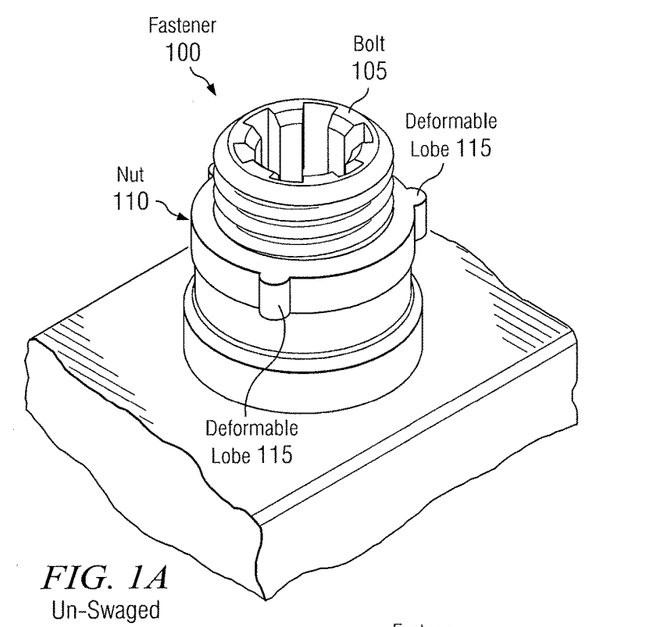
FIG. 1A illustrates a nut having one or more deformable lobes, in accordance with certain embodiments.

FIG. 1A illustrates a fastener 100, in accordance with certain embodiments. Fastener 100 includes a bolt 105 and a nut 110. Bolt 105 and nut 110 may be components of any suitable fastening system. For example, bolt 105 and nut 110 may be components of the Alcoa EDDIE-BOLT fastening system. Nut 110 may have one or more deformable lobes 115. As described above, during installation of fastener 100, one or more deformable lobes 115 may be swaged (i.e., rounded off or deformed) to ensure proper torque has been achieved. As shown in FIG. 1A, lobes 115 have not been rounded off, which indicates that proper torque was not achieved. As described in more detail below, certain embodiments described herein may reduce the risk associated with identifying and repairing such nonconforming fastener installations by allowing an installer to verify nut 110 has been properly swaged at the time of installation. More specifically, because failure to achieve proper swaging will prevent removal of the nut swaging verification apparatus unless a manual override feature is used.

Figure 1B:
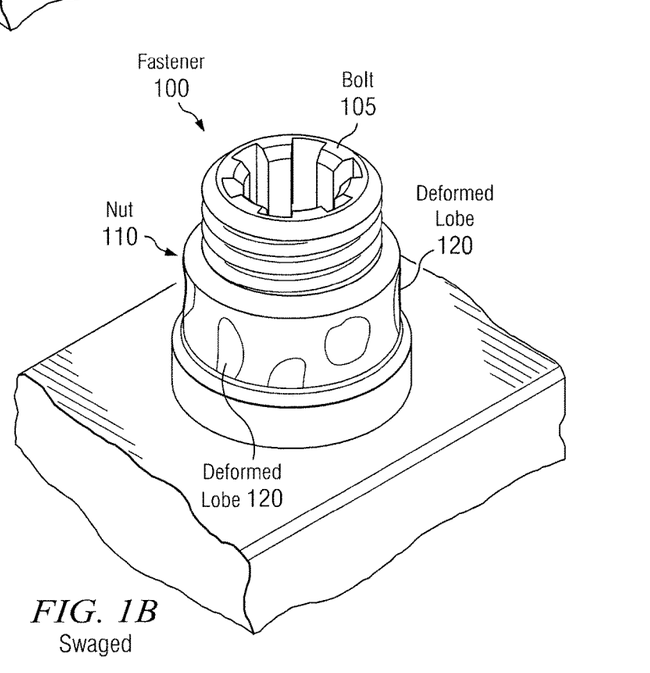
FIG. 1B illustrates the nut of FIG. 1A with the one or more deformable lobes deformed, in accordance with certain embodiments.

FIG. 1B illustrates installed fastener 100, in accordance with certain embodiments. As described above, fastener 100 includes bolt 105 and nut 110. Nut 110 includes deformed lobes 120. In other words, one or more deformable lobes 115 described above in relation to FIG. 1A have been properly swaged (i.e., rounded off). Deformed lobes 120 provide an indication that the proper amount of torque was achieved during installation of nut 110 on bolt 105. Certain embodiments described herein may advantageously allow an installer to verify that nut 110 has been properly swaged at the time of installation. As described in more detail below, if proper swaging is achieved, the nut swaging verification apparatus may be easily removed from nut 110.

Figures 2, 3:
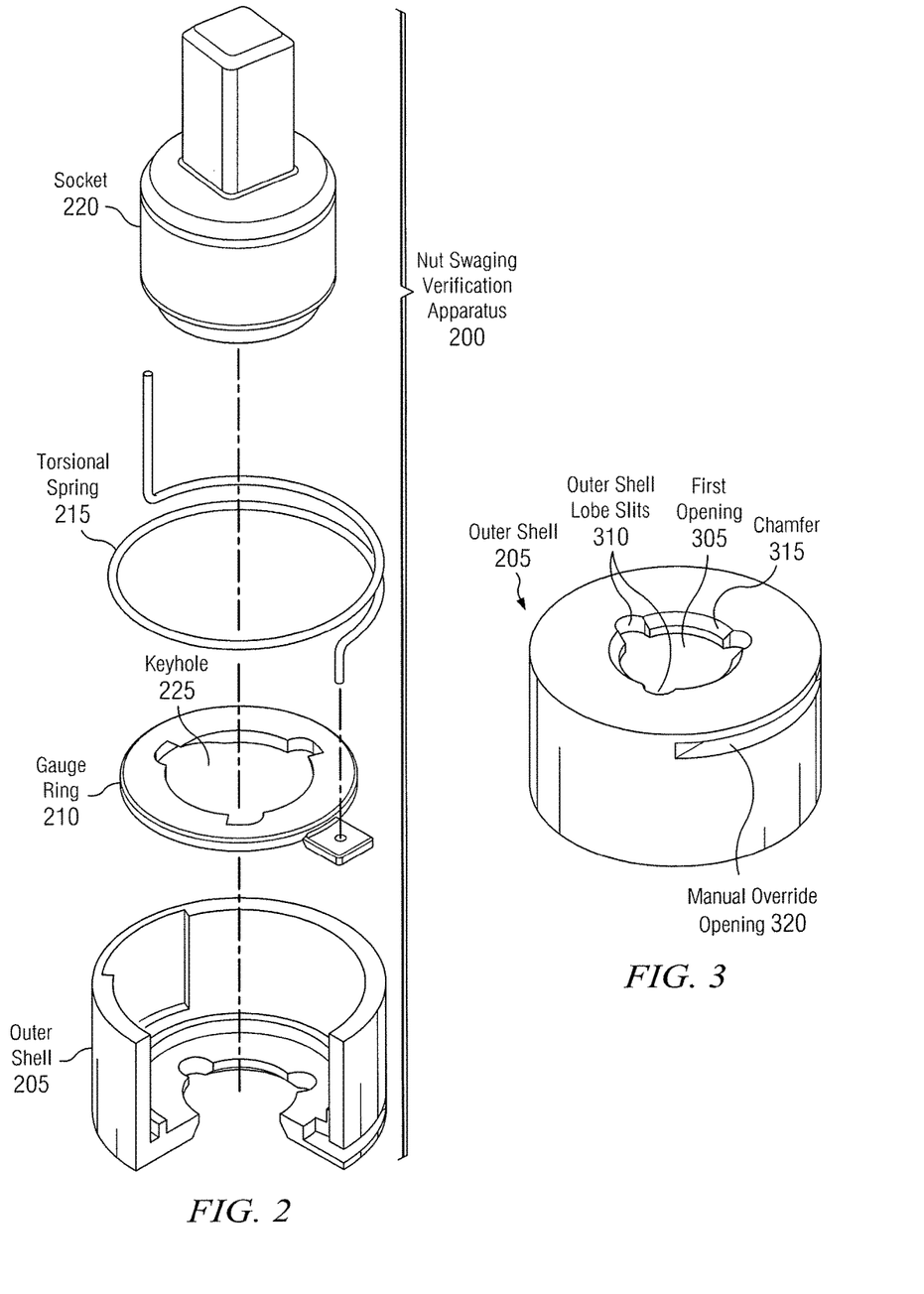
FIG. 2 illustrates an exploded view of a nut swaging verification apparatus, in accordance with certain embodiments.
FIG. 3 illustrates a view of the exterior of the outer shell of the nut swaging verification apparatus of FIG. 2, in accordance with certain embodiments.

FIG. 2 illustrates an exploded view of a nut swaging verification apparatus 200, in accordance with certain embodiments. Nut swaging verification apparatus 200 may include an outer shell 205, a gauge ring 210, a torsional spring 215, and a socket 220.

In general, outer shell 205 may be configured to contain gauge ring 210 and torsional spring 215, and may be further configured to couple to socket 220. Outer shell 205 may couple to socket 220 in any suitable manner. For example, in certain embodiments, outer shell 205 may be coupled to socket 220 via welding. In other embodiments, outer shell 205 may be removably coupled to socket 220. Such an embodiment may advantageously allow access to components housed within outer shell 205, such as gauge ring 210 and torsional spring 215. Outer shell 205 may be formed of any suitable material, and may have any suitable dimensions. For example, outer shell 205 may be formed of carbon steel. Outer shell 205 is described in more detail below in relation to FIGS. 3 and 4A-4B.

Gauge ring 210 may be configured to be contained within outer shell 215. Gauge ring 210 may be formed of any suitable material. For example, in certain embodiments, gauge ring 210 may be formed of 1045 carbon steel with a hardness of 111 Rockwell B, or any other suitable material having any other suitable properties. Gauge ring 210 may have any suitable dimensions. The dimensions of gauge ring 210 may vary according to particular applications. For example, nut swaging verification apparatus 200 may be configured to work with a variety of fastening systems that may employ a variety of types of fasteners. For example, the EDDIE-BOLT system includes fasteners of different sizes. Thus, in particular embodiments, the dimensions of gauge ring 210 may be adapted to function with a fastener of a particular size. Gauge ring 210 may have any suitable thickness. As one example, gauge ring 210 may have a thickness of approximately 0.032 inches.

In operation, gauge ring 210 may be configured to rotate to a first position as nut swaging apparatus 200 is positioned over nut 110 to allow nut 110 to pass through keyhole 225 and into socket 220 located in an interior portion of outer shell 205. As described in more detail below in relation to FIGS. 5 and 6A-6D, gauge ring 210 may be configured to rotate to a second position once nut 110 has passed through keyhole 225. After rotating to the second position, nut swaging verification apparatus 200 may not be able to be removed from nut 110 unless one or more deformable lobes 115 are successfully deformed during fastening.

Gauge ring 210 may be coupled to torsional spring 215. Torsional spring 215 may be formed of any suitable material, and may have any suitable dimensions with any suitable spring constant. As described above, gauge ring 210 may be configured to rotate to the first position as nut swaging apparatus 200 is positioned over nut 110 to allow nut 110 to pass through keyhole 225. In certain embodiments, a load may be applied to torsional spring 215 as gauge ring 210 rotates to the first position. When nut 110 passes through keyhole 225 of gauge ring 210, the load applied to torsional spring 215 may be released. Release of the load applied to torsional spring 215 may cause gauge ring 210 to rotate to the second position. The operation of torsional spring 215 is described in more detail below in relation to FIGS. 5 and 6A-6D.

Socket 220 may be configured to couple to outer shell 205. In certain embodiments, socket 220 may be a component of a fastening system, such as a DELTA-RAD nut drive socket of the EDDIE-BOLT fastening system. Socket 220 may be formed of any suitable material, such as, for example, carbon steel. Socket 220 may have any suitable dimensions. The dimensions of socket may vary according to particular embodiments. For example, the dimensions of socket 220 may vary according to the size of a particular fastener with which it is intended to be used. Socket 220 may be configured to receive nut 110 and, in combination with a fastening system, fasten nut 110 to bolt 105. In certain embodiments, socket 220 may be configured to swage nut 110 (i.e., round off one or more deformable lobes 115 of nut 110) during fastening. As described above, removal of one or more lobes 115 may ensure that a proper amount of torque has been achieved.

When assembled, outer shell 205 may house gauge ring 210 and torsional spring 215. Outer shell 205 may couple to socket 220 to form nut swaging verification apparatus 200. The arrangement of gauge ring 210 and torsional spring 215 within outer shell 205 may be such that gauge ring 210 is positioned in relation to socket 220 so that nut 110 must pass through a keyhole 225 of gauge ring 210 before entering socket 220. As described above, the rotation of gauge ring 210 to the first position and the subsequent rotation of gauge ring 210 caused by release of the load applied to torsional spring 215 may prevent removal of nut swaging verification apparatus 200 from nut 110 until one or more deformable lobes 115 are deformed by socket 220 during fastening.

FIG. 3 illustrates a view of the exterior of outer shell 205, in accordance with certain embodiments. As described above, outer shell 205 may be formed from any suitable material and may have any suitable dimensions. Outer shell 205 may be adapted to couple to socket 220. In certain embodiments, outer shell 205 comprises a first opening 305, one or more outer shell lobe slits 310, a chamfer 315, and a manual override opening 320.

First opening 305 may be configured to allow nut 110 having one or more deformable lobes 115 to pass through it as outer shell 205 is placed over nut 110. First opening 305 may have any suitable dimensions, and the dimensions of first opening 305 may vary according to particular applications. For example, in certain embodiments, the dimensions of first opening 305 may be configured to fit a particular fastener of a particular size.

First opening 305 may have any suitable shape. For example, in certain embodiments the shape of first opening 305 may be defined at least in part by one or more outer shell lobe slits 310. Outer shell lobe slits 310 may have any suitable shape. For example, outer shell lobe slits 310 may be arranged around first opening 305 such that the outer shell lobe slits 310 allow nut 110 having one or more deformable lobes 115 to pass through first opening 305 as outer shell 205 is positioned on nut 110.

Chamfer 315 may be a transitional edge adjacent first opening 305. Chamfer 315 may have any suitable angle. For example, in certain embodiments chamfer 315 may be forty-five degrees. In certain embodiments, chamfer 315 may advantageously allow easier alignment of first opening 305 over nut 110 as nut swaging verification apparatus 200 is positioned over nut 110 during the fastening process.

Manual override opening 320 may comprise an opening in outer shell 205. Manual override opening 320 may have any suitable dimensions. In certain embodiments, manual override opening 320 may be configured to receive a manual override tab of gauge ring 210. As described above, in certain embodiments after nut 110 passes through keyhole 225 of gauge ring 210, gauge ring 210 may rotate such that nut swaging verification apparatus 200 cannot be removed from nut 110 unless one or more deformable lobes 115 of nut 110 are deformed during fastening. In some cases, however, one or more deformable lobes 115 may not be properly swaged during fastening of nut 110. As a result, an installer of nut 110 may not be able to remove nut swaging verification apparatus 200 from nut 110. As described above, the inability to remove nut swaging verification apparatus 200 from nut 110 may indicate to an installer that nut 110 was not properly swaged. In order to reprocess the nonconforming installation, it may be desirable for the installer to be able to remove nut swaging verification apparatus 200 from nut 110. In certain embodiments, this may be accomplished by applying pressure to a manual override tab. The manual override tab may be accessible via manual override opening 320. In certain embodiments, applying pressure to the manual override tab may cause gauge ring 210 to rotate to the first position, aligning outer shell lobe slits 310 with one or more gauge ring lobe slits, allowing nut swaging verification apparatus 200 to be removed from nut 110 even though one or more deformable lobes 115 have not been properly swaged.

Figure 4A:
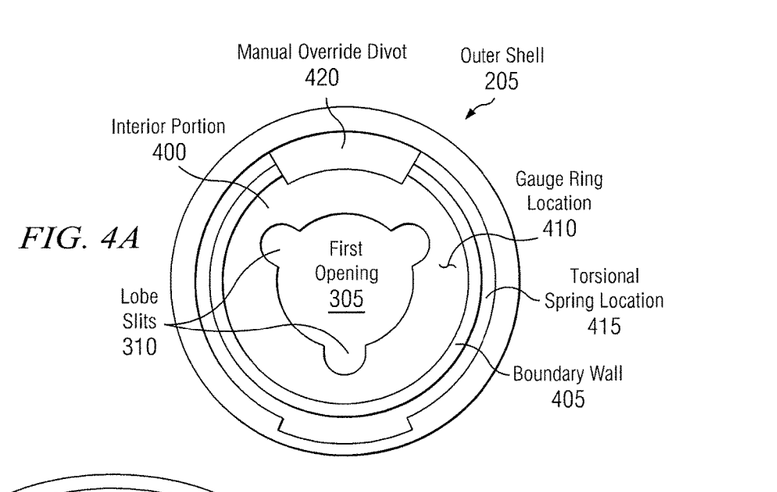
FIG. 4A illustrates a view of an interior portion of the outer shell of FIG. 3, in accordance with certain embodiments.

FIG. 4A illustrates a view of interior portion 400 of outer shell 205 of FIG. 3, in accordance with certain embodiments. Interior portion 400 of outer shell 205 includes a boundary wall 405. Boundary wall 405 may divide interior portion 400 into gauge ring location 410 and torsional spring location 415. In certain embodiments, gauge ring 210 may be located at gauge ring location 410. Positioning gauge ring 210 at gauge ring location 410 allows keyhole 225 of gauge ring 210 to be positioned over first opening 305 of outer shell 205, so that as gauge ring 210 rotates to the first position, outer shell lobe slits 310 align with one or more gauge ring lobe slits to allow nut 110 to pass through first opening 305 and keyhole 225 of gauge ring 210.

Torsional spring 215 may be located at torsional spring location 415. Positioning torsional spring 215 at torsional spring location 415 allows torsional spring 215 to couple to gauge ring 210 such that as gauge ring 210 rotates, a load may be applied to torsional spring 215. After nut 110 passes through first opening 305 and keyhole 225 of gauge ring 210, the load applied to torsional spring 215 may be released, causing gauge ring 210 to rotate to the second position in which lobe slits 310 are no longer aligned with the gauge ring lobe slits, preventing nut 110 from passing back through keyhole 225 and first opening 305. Thus, when outer shell lobe slits 310 are out of alignment with gauge ring lobe slits, nut swaging verification apparatus 200 may not be able to be removed from nut 110 without the use of a manual override feature.

Manual override divot 420 may be configured to allow a manual override tab of gauge ring 210 to be accessible through manual override opening 320 described above. By making the manual override tab of gauge ring 210 accessible, an operator may manually rotate gauge ring 210 to the first position, which may align outer shell lobe slits 310 and gauge ring lobe slits, permitting nut swaging verification apparatus 200 to be removed from nut 110 even though one or more deformable lobes 115 have not been deformed during fastening.

Figure 4B:
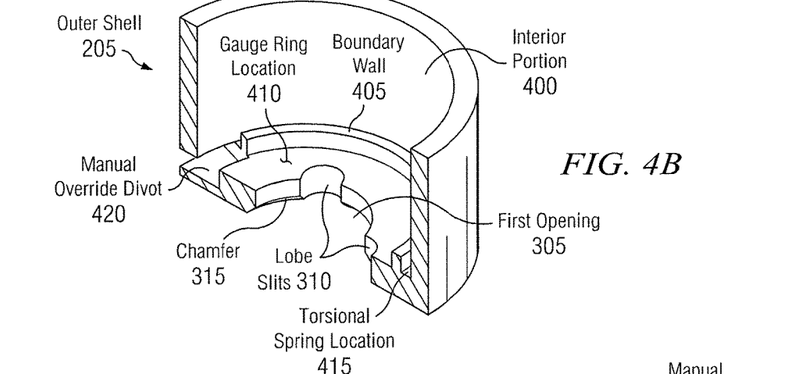
FIG. 4B illustrates another view of the outer shell of FIG. 4A, in accordance with certain embodiments.

FIG. 4B illustrates another view of outer shell 205, in accordance with certain embodiments. More particularly, FIG. 4B illustrates a cross-section of outer shell 205 illustrated in FIG. 4A. As described above in relation to FIG. 4A, outer shell 205 may include first opening 305, lobe slits 310, chamfer 314, interior portion 400, boundary wall 405, gauge ring location 410, torsional spring location 415, and manual override divot 420.

Figure 5:
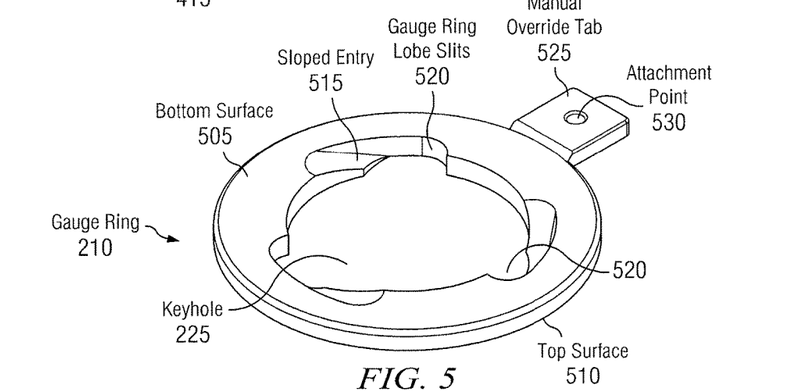
FIG. 5 illustrates the gauge ring of the nut swaging verification apparatus of FIG. 2 coupled to a torsional spring, in accordance with certain embodiments.

FIG. 5 illustrates gauge ring 210 of nut swaging verification apparatus 200 coupled to torsional spring 215, in accordance with certain embodiments. As described above, gauge ring 210 may be formed of any suitable materials and have any suitable dimensions. In certain embodiments, gauge ring 210 includes a bottom surface 505 and a top surface 510. In the assembled nut swaging apparatus 200, bottom surface 505 may be configured to face first opening 305 of outer shell 205. Top surface 510 is opposite bottom surface 505.

Gauge ring 210 includes one or more sloped entries 515. In certain embodiments, sloped entry 515 comprises a surface that extends from bottom surface 505 to top surface 510. Sloped entry 515 may be configured to cause the rotation of gauge ring 210 to a first position. For example, in certain embodiments, when nut swaging verification apparatus 200 is positioned over nut 110, one or more deformable lobes 115 of nut 110 may contact sloped entry 515 at a location near bottom surface 505. As pressure is exerted on nut 110, nut 110 moves along one or more sloped entries 515. As nut 110 moves along sloped entry 515, gauge ring 210 may rotate to the first position. The operation of gauge ring 210 and sloped entry 515 are described in more detail below in relation to FIGS. 6A-6D.

In certain embodiments, keyhole 225 may comprise an opening in gauge ring 210. Keyhole 225 may have any suitable shape. For example, keyhole 225 may have a shape configured to allow nut 110 with one or more deformable lobes 115 to pass through. In certain embodiments, keyhole 225 includes gauge ring lobe slits 520. Gauge ring lobe slits 520 may be configured to match the shape of deformable lobes 115 and allow nut 110 to pass through keyhole 225. For example, as gauge ring 210 rotates while nut 110 is in contact with one or more sloped entries 515, gauge ring lobe slits 520 may align with one or more outer shell lobe slits 310 described above in relation to FIGS. 3 and 4A-4B. When gauge ring lobe slits 520 align with one or more outer shell lobe slits 310, nut 110 with one or more deformable lobes 115 may be able to pass through keyhole 225. After nut 110 passes through keyhole 225, the rotation of gauge ring 210 from the first position to the second position may cause gauge ring lobe slits 520 to no longer be in alignment with outer shell lobe slits 310. As a result, nut 110 with one or more deformable lobes 115 may not be able to pass back through keyhole 225, preventing removal of nut swaging verification apparatus 200 unless one or more deformable lobes 115 are properly deformed.

In certain embodiments, gauge ring 210 may include manual override tab 525. Manual override tab 525 may be installed in manual override divot 420 described above in relation to FIGS. 4A-4B. Manual override tab 525 may be configured to be accessible from manual override opening 320 described above in relation to FIG. 3. In certain embodiments, manual override tab 525 may protrude from manual override opening 320 such that an installer may use it to release nut swaging verification apparatus 200 from an unswaged nut. As described above, deformable lobes 115 may not be properly deformed during fastening, preventing removal of nut swaging verification apparatus 200 from nut 110. If this occurs, an installer may use manual override tab 525 to remove nut swaging apparatus 200 from nut 110. For example, an installer may apply pressure to manual override tab 525 in order to cause gauge ring 210 to rotate to the first position, thereby causing gauge ring lobe slits 520 to align with outer shell lobe slits 310. When gauge ring lobe slits 520 and outer shell lobe slits 310 are in alignment, nut 110 with deformable lobes 115 may pass back through keyhole 225 and first opening 305, thus allowing nut swaging verification apparatus 200 to be removed from nut 110 even though deformable lobes 115 have not been properly swaged.

In some embodiments, gauge ring 210 may include an attachment point 530. Attachment point 530 may be configured to couple gauge ring 210 to torsional spring 215. Attachment point 530 may be located at any suitable position of gauge ring 210. In certain embodiments, for example, attachment point 530 may be located on manual override tab 525. Torsional spring 215 may be coupled to gauge ring 210 at attachment point 530 in any suitable manner.

Figure 6A:
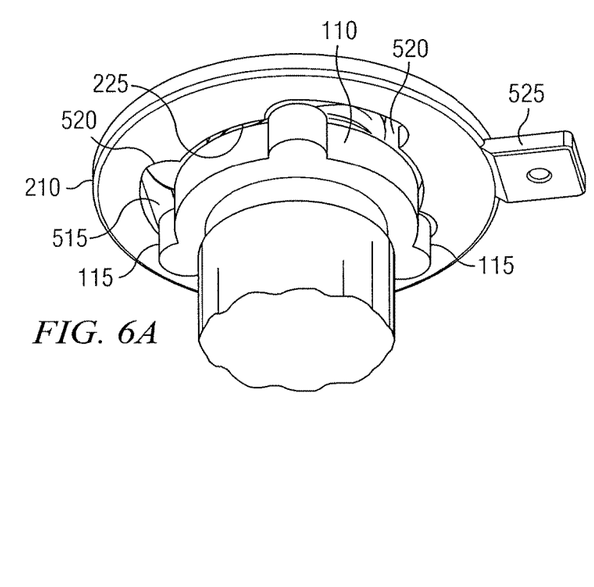
FIGS. 6A-6H illustrate the rotation of the gauge ring during operation, in accordance with certain embodiments.

FIGS. 6A-6D illustrate rotation of gauge ring 210 during operation, in accordance with certain embodiments. More particularly, FIG. 6A illustrates the first step in the operation of gauge ring 210 as nut swaging verification apparatus 200 is placed over nut 110. As described above, chamfer 315 may allow for easier alignment of first opening 305 and outer shell lobe slits 310 with one or more deformable lobes 115 of nut 110. Once deformable lobes 115 of nut 110 are aligned with outer shell lobe slits 310, nut 110 may pass through first opening 305. After passing through first opening 305, deformable lobes 115 of nut 110 may contact one or more sloped entries 515 of gauge ring 210.

Figure 6B:
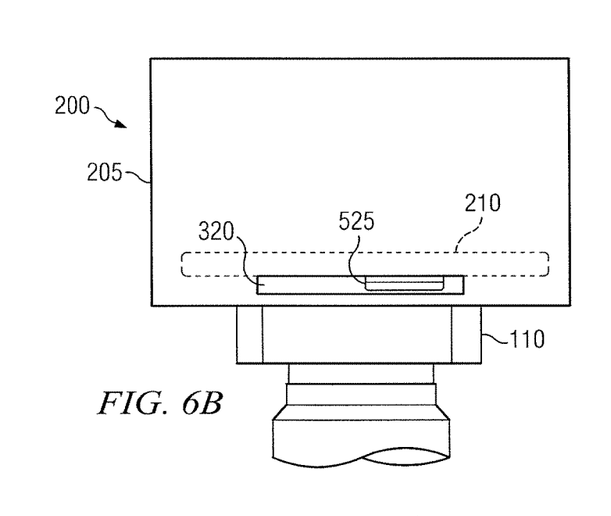

FIG. 6B illustrates another view of the first step in the operation of gauge ring 210 as described above in relation to FIG. 6A. More particularly, FIG. 6B illustrates nut 110 as it enters nut swaging verification apparatus 200. The position of gauge ring 210 at this point is illustrated by the position of manual override tab 525 within manual override opening 320.

Figure 6C:
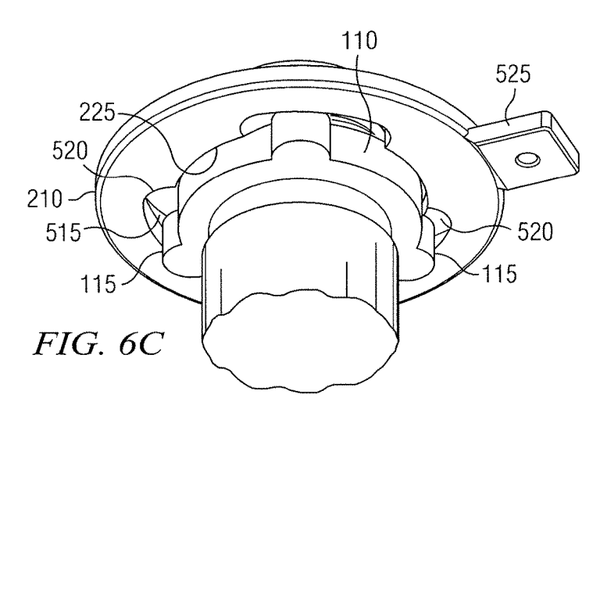

FIG. 6C illustrates the next step in the operation of gauge ring 210 after deformable lobes 115 of nut 110 contact sloped entries 515. Pressure exerted on nut 110 by nut swaging verification apparatus 200 causes gauge ring 210 to begin to rotate to a first position. The angle of sloped entries 515 may determine the amount of pressure required to cause gauge ring 210 to rotate. The angle of sloped entries 515 may be any suitable angle. For example, in certain embodiments sloped entries 515 may have an angle of approximately thirty-seven degrees. As gauge ring 210 rotates to the first position, gauge ring lobe slits 520 align with outer shell lobe slits 310. Gauge ring 210 may rotate any suitable amount.

Figure 6D:
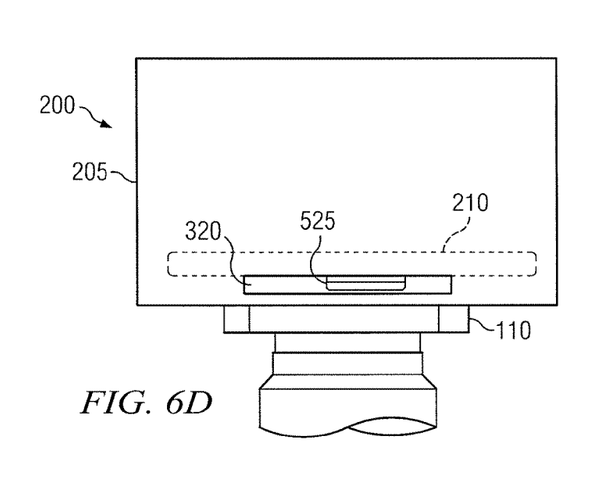

FIG. 6D illustrates another view of the operation of gauge ring 210 described above in relation to FIG. 6C. More particularly, FIG. 6D illustrates the operation of gauge ring 210 after deformable lobes 115 of nut 110 contact sloped entries 515. As described above, pressure exerted on nut 110 by nut swaging verification apparatus 200 causes gauge ring 210 to begin to rotate to a first position. In FIG. 6D, the rotation of gauge ring 210 is illustrated by the change in position of manual override tab 525 within manual override opening 320 as compared to the position of manual override tab 525 illustrated in FIG. 6B.

Figure 6E:
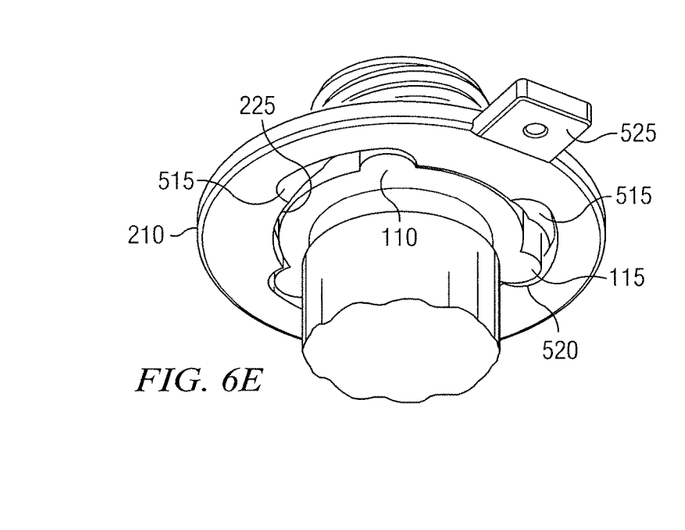

FIG. 6E illustrates the further operation of gauge ring 210. More particularly, FIG. 6E illustrates the point at which gauge ring 210 has completed its rotation to the first position. At the first position, gauge ring lobe slits 520 align with outer shell lobe slits 310. With gauge ring lobe slits 520 and outer shell lobe slits 310 aligned, nut 110 having one or more deformable lobes 115 may pass through keyhole 225 and into socket 220 described above.

Figure 6F:
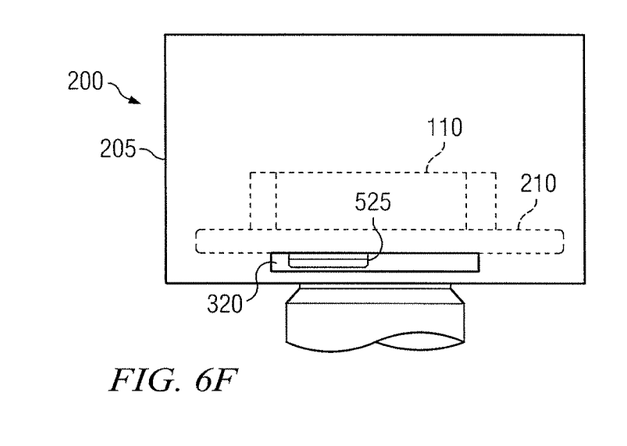

FIG. 6F illustrates another view of the operation of gauge ring 210 described above in relation to FIG. 6E. More particularly, FIG. 6F illustrates gauge ring 210 at the first position. At the first position, gauge ring lobe slits 520 are aligned with outer shell lobe slits 310, allowing nut 110 having one or more deformable lobes 115 to pass through keyhole 225 and into socket 220 as described above. In FIG. 6F, the rotation of gauge ring 210 to the first position is illustrated by the change in position of manual override tab 525 within manual override opening 320 as compared to the position of manual override tab 525 illustrated in FIG. 6D.

Figure 6G:
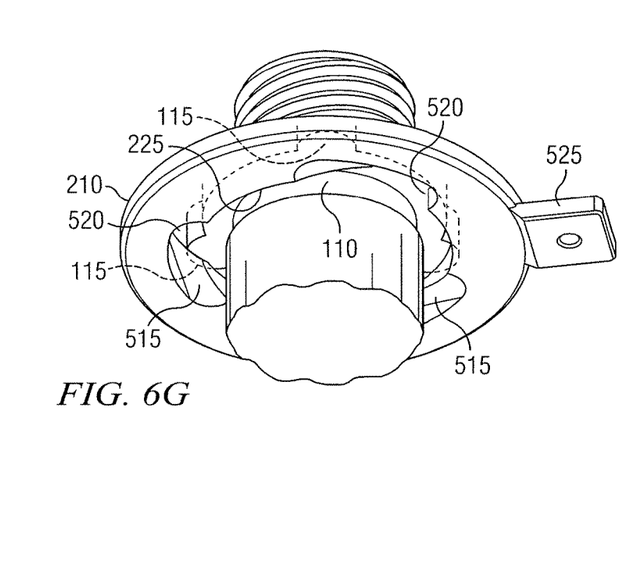

FIG. 6G illustrates the operation of gauge ring 210 after nut 110 has passed through keyhole 225. As described above, the rotation of gauge ring 210 to the first position in response to pressure being exerted on nut 110 causes a load to be applied to torsional spring 215. After nut 110 passes through keyhole 225 and into socket 220 (as described above in relation to FIG. 6E), the load applied to torsional spring 215 may be released. Releasing the load on torsional spring 215 causes gauge ring 210 to rotate to a second position. The second position may correspond to the original position of the gauge ring at the time deformable lobes 115 of nut 110 contacted sloped entries 515. At the second position, gauge ring lobe slits 520 are no longer aligned with outer shell lobe slits 310. Because gauge ring lobe slits 520 are not aligned with outer shell lobe slits 310, deformable lobes 115 of nut 110 cannot pass back through keyhole 225. More specifically, gauge ring 210 blocks nut 110 from moving back through keyhole 225, and only a nut that has had its deformable lobes 115 deformed can fit through keyhole 225 when gauge ring 210 is at the second position. Thus, nut swaging verification apparatus 200 cannot be removed from nut 110 unless deformable lobes 115 are properly swaged or manual override tab 525 is used to rotate gauge ring 210 to the first position, thereby aligning gauge ring lobe slits 520 with outer shell lobe slits 310 and allowing nut swaging verification apparatus 200 to be removed from nut 110.

Figure 6H:
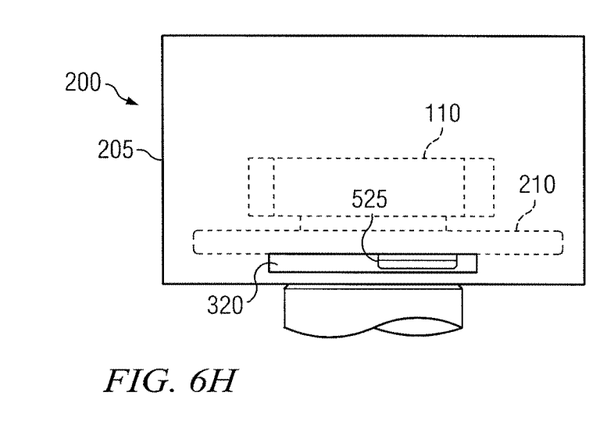

FIG. 6H illustrates another view of the operation of gauge ring 210 as described above in relation to FIG. 6G. As described above in relation to FIG. 6G, releasing the load on torsional spring 215 causes gauge ring 210 to rotate to a second position. The second position may correspond to the original position of gauge ring 210 at the time deformable lobes 115 of nut 110 contacted sloped entries 515. At the second position, gauge ring lobe slits 520 are no longer aligned with outer shell lobe slits 310. In FIG. 6H, the movement of gauge ring 210 to the second position is illustrated by the change in position of manual override tab 525 within manual override opening 320 as compared to the position of manual override tab 525 illustrated in FIG. 6F. Thus, nut swaging verification apparatus 200 may not be able to be removed from nut 110 unless deformable lobes 115 are properly swaged or manual override tab 525 is used to rotate gauge ring 210 to the first position, thereby aligning gauge ring lobe slits 520 with outer shell lobe slits 310 and allowing nut swaging verification apparatus 200 to be removed from nut 110.

Figure 7:
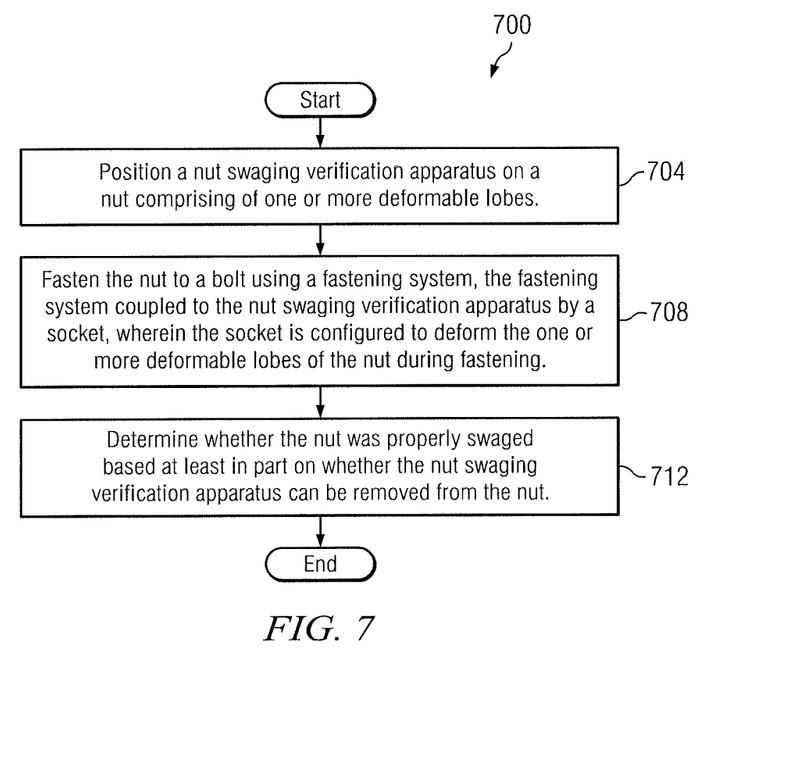
FIG. 7 illustrates a method for verifying nut swaging, in accordance with certain embodiments.

FIG. 7 illustrates a method 700 for verifying nut swaging, in accordance with certain embodiments. Method 700 begins at step 704, where a nut swaging verification apparatus is positioned on a nut comprising one or more deformable lobes. In certain embodiments, the nut swaging verification apparatus may comprise an outer shell, a gauge ring, and a spring. The outer shell may comprise an opening comprising one or more outer shell lobe slits, the opening configured to allow the nut comprising one or more deformable lobes to pass through the opening and into an interior portion of the outer shell. The gauge ring may be configured to be placed inside the interior portion of the outer shell, and may comprise a bottom surface configured to face the opening of the outer shell, a top surface opposite the bottom surface, and a keyhole comprising one or more gauge ring lobe slits and a sloped entry. The spring may be configured to be coupled to the gauge ring and configured to cause the gauge ring to rotate from a first position to a second position. In certain embodiments, the gauge ring may be further configured to rotate to the first position as the nut moves along the sloped entry. In certain embodiments, the sloped entry may comprise an angle of approximately thirty-seven degrees.

The spring may be any suitable spring, such as, for example, a torsional spring. In certain embodiments, the gauge ring may be configured to rotate to the first position as the nut passes through the opening of the outer shell and contacts the sloped entry of the gauge ring. The first position may permit the nut to pass through the gauge ring and into a socket by aligning the one or more gauge ring lobe slits with the one or more outer shell lobe slits and the one or more deformable lobes of the nut. The spring may be configured to rotate the gauge ring to the second position after the nut passes through the gauge ring and into the socket. The second position may prevent the nut from exiting the socket by preventing alignment of the one or more gauge ring lobe slits with the one or more outer shell lobe slits.

At step 708, the nut is fastened to the bolt using a fastening system. The fastening system may be coupled to the nut swaging verification apparatus by a socket, and the socket may be configured to deform the one or more deformable lobes of the nut during fastening. In certain embodiments, the gauge ring, while in either the first or second position, may be configured to permit the nut to exit the socket after the one or more deformable lobes of the nut have been deformed by the socket.

At step 712, it is determined whether the nut was properly swaged based at least in part on whether the nut swaging verification apparatus can be removed from the nut. In certain embodiments, the method may further comprise determining that the one or more deformable lobes of the nut were deformed when the nut swaging verification apparatus can be removed from the nut, and determining that the one or more deformable lobes of the nut were not deformed when the nut swaging verification apparatus cannot be removed from the nut.

In certain embodiments, the outer shell may further comprise a manual override opening and the gauge ring may further comprise a manual override tab positioned in the manual override opening of the outer shell. The method may further comprise applying pressure to the manual override tab to remove the nut swaging verification apparatus upon a determination that the one or more deformable lobes of the nut have not been properly deformed.

Although certain embodiments may be described in relation to particular fastening systems, such as the EDDIE-BOLT fastening system, the present disclosure contemplates that the various embodiments described herein may be used with any suitable fastening systems.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A system for verifying nut swaging, comprising:
a fastening system; and
a nut swaging verification apparatus, comprising:
an outer shell comprising an opening comprising one or more outer shell lobe slits, the opening configured to allow a nut comprising one or more deformable lobes to pass through the opening and into an interior portion of the outer shell;
a gauge ring configured to be placed inside the interior portion of the outer shell, the gauge ring comprising:
a bottom surface configured to face the first opening;
a top surface opposite the bottom surface; and
a keyhole comprising one or more gauge ring lobe slits and a sloped entry; and
a spring configured to be coupled to the gauge ring and configured to cause the gauge ring to rotate from a first position to a second position;
wherein the gauge ring is configured to rotate to the first position as the nut passes through the opening of the outer shell and contacts the sloped entry of the gauge ring, the first position permitting the nut to pass through the gauge ring and into a socket by aligning the one or more gauge ring lobe slits with the one or more outer shell lobe slits and the one or more deformable lobes of the nut;
wherein the spring is configured to rotate the gauge ring to the second position after the nut passes through the gauge ring and into the socket, the second position preventing the nut from exiting the socket by preventing alignment of the one or more gauge ring lobe slits with the one or more outer shell lobe slits; and
wherein the gauge ring, while in either the first or second position, is configured to permit the nut to exit the socket after the one or more deformable lobes of the nut have been deformed by the socket.

2. The system of claim 1, wherein the sloped entry comprises an angle of approximately thirty-seven degrees.

3. The system of claim 1, wherein the gauge ring is further configured to rotate to the first position as the nut moves along the sloped entry.

4. The system of claim 1, wherein the outer shell further comprises a manual override opening and the gauge ring further comprises a manual override tab positioned in the manual override opening of the outer shell.

5. The system of claim 4, wherein, when pressure is applied to the manual override tab, the nut can be removed before the one or more deformable lobes of the nut have been deformed.

6. The system of claim 1, wherein the socket is configured to deform the one or more deformable lobes of the nut during fastening.

7. The system of claim 1, wherein at least a portion of the torsional spring is located between an outer wall of the outer shell and a boundary wall located in the interior of the outer shell.

8. An apparatus, comprising:
an outer shell comprising an opening comprising one or more outer shell lobe slits, the opening configured to allow a nut comprising one or more deformable lobes to pass through the opening and into an interior portion of the outer shell;
a gauge ring configured to be placed inside the interior portion of the outer shell, the gauge ring comprising:
a bottom surface configured to face the opening of the outer shell;
a top surface opposite the bottom surface; and
a keyhole comprising one or more gauge ring lobe slits and a sloped entry; and
a spring configured to be coupled to the gauge ring and configured to cause the gauge ring to rotate from a first position to a second position;
wherein the gauge ring is configured to rotate to the first position as the nut passes through the opening of the outer shell and contacts the sloped entry of the gauge ring, the first position permitting the nut to pass through the gauge ring and into a socket by aligning the one or more gauge ring lobe slits with the one or more outer shell lobe slits and the one or more deformable lobes of the nut;
wherein the spring is configured to rotate the gauge ring to the second position after the nut passes through the gauge ring and into the socket, the second position preventing the nut from exiting the socket by preventing alignment of the one or more gauge ring lobe slits with the one or more outer shell lobe slits.

9. The apparatus of claim 8, wherein the gauge ring, while in either the first or second position, is configured to permit the nut to exit the socket after the one or more deformable lobes of the nut have been deformed by the socket.

10. The apparatus of claim 8, wherein the sloped entry comprises an angle of approximately thirty-seven degrees.

11. The apparatus of claim 8, wherein the gauge ring is further configured to rotate to the first position as the nut moves along the sloped entry.

12. The apparatus of claim 8, wherein the outer shell further comprises a manual override opening and the gauge ring further comprises a manual override tab positioned in the manual override opening of the outer shell, such that when pressure is applied to the manual override tab, the nut can be removed before the one or more deformable lobes of the nut have been deformed.

13. The apparatus of claim 8, wherein the socket is configured to deform the one or more deformable lobes of the nut during fastening.

14. The apparatus of claim 1, wherein at least a portion of the torsional spring is located between an outer wall of the outer shell and a boundary wall located in the interior of the outer shell.

15. A method for verifying nut swaging, comprising:
positioning a nut swaging verification apparatus on a nut comprising one or more deformable lobes;

fastening the nut to a bolt using a fastening system, the fastening system coupled to the nut swaging verification apparatus by a socket, wherein the socket is configured to deform the one or more deformable lobes of the nut during fastening; and determining whether the nut was properly swaged based at least in part on whether the nut swaging verification apparatus can be removed from the nut.

16. The method of claim 15, further comprising one of:
determining that the one or more deformable lobes of the nut were deformed when the nut swaging verification apparatus can be removed from the nut; and
determining that the one or more deformable lobes of the nut were not deformed when the nut swaging verification apparatus cannot be removed from the nut.

17. The method of claim 15, wherein the nut swaging verification apparatus comprises:
an outer shell comprising an opening comprising one or more outer shell lobe slits, the opening configured to allow a nut having one or more deformable lobes to pass through the opening and into an interior portion of the outer shell;
a gauge ring configured to be placed inside the interior portion of the outer shell, the gauge ring comprising:
a bottom surface configured to face the opening of the outer shell;
a top surface opposite the bottom surface; and
a keyhole comprising one or more gauge ring lobe slits and a sloped entry; and
a spring configured to be coupled to the gauge ring and configured to cause the gauge ring to rotate from a first position to a second position;
wherein the gauge ring is configured to rotate to the first position as the nut passes through the opening of the outer shell and contacts the sloped entry of the gauge ring, the first position permitting the nut to pass through the gauge ring and into the socket by aligning the one or more gauge ring lobe slits with the one or more outer shell lobe slits and the one or more deformable lobes of the nut;
wherein the spring is configured to rotate the gauge ring to the second position after the nut passes through the gauge ring and into the socket, the second position preventing the nut from exiting the socket by preventing alignment of the one or more gauge ring lobe slits with the one or more outer shell lobe slits.

18. The method of claim 17, wherein the gauge ring is further configured to rotate to the first position as the nut moves along the sloped entry.

19. The method of claim 17, wherein the gauge ring, while in either the first or second position, is configured to permit the nut to exit the socket after the one or more deformable lobes of the nut have been deformed by the socket.

20. The method of claim 17, wherein:
the outer shell further comprises a manual override opening and the gauge ring further comprises a manual override tab positioned in the manual override opening of the outer shell; and
the method further comprises applying pressure to the manual override tab to remove the nut swaging verification apparatus upon a determination that the one or more deformable lobes of the nut have not been properly deformed.

* * * * *